Nov. 21, 1961 W. R. SNELL 3,009,392
WIDE ANGLE REAR VIEW MIRROR FOR VEHICLES
Filed May 7, 1958

INVENTOR.
WILLIAM R. SNELL
BY
his ATTORNEY

3,009,392
WIDE ANGLE REAR VIEW MIRROR FOR VEHICLES

William R. Snell, Cleveland, Ohio
(4145 Bluestone Road, Cleveland Heights, Ohio)
Filed May 7, 1958, Ser. No. 733,763
3 Claims. (Cl. 88—87)

This invention relates to rear view mirrors for vehicles such as automobiles, boats and the like and relates more particularly to a mirror or reflector for making observations of the road and traffic not only directly to the rear of the vehicle in which the device is mounted, but also to the rear right and rear left thereof.

It is one of the objects of this invention to provide as a unit a combination rear, right and left viewing mirror.

Another object of the invention is a mirror or reflector of the above type which can conveniently be mounted in the body of the vehicle and which will eliminate the necessity for individual right and left reflectors mounted outside the vehicle body, such as on fenders, doors or other exterior parts of the body.

A further object of the invention is the provision of a single reflector unit which can be mounted within the vehicle body on the windshield frame or on the dash and which will provide clear and undistorted vision for the operator to the rear of the vehicle whereby the operator may at all times observe traffic approaching from the rear right and rear left lanes, as well as directly from the rear.

Another object of the invention is to provide means whereby the operator, at a glance, has undistorted and uninterrupted observation of approaching traffic, not only from the direct rear, but also from the rear right and/or rear left.

Still another object of the invention is to provide means whereby the operator of the vehicle may with continuity observe traffic approaching from the rear, right and left until it can be observed directly by normal frontal vision.

Another object of the invention is to construct a device of the character described which is compact in over-all size and shape, thus eliminating interference with normal frontal vision.

A still further object of the invention is to provide a device of this type which will permit more complete and better perception of distance, depth and speed of oncoming traffic from the rear, right and left, which qualities are not common in outside mounted reflectors.

A still further object of the invention is to provide a reflector of the type defined which is simple of construction and relatively inexpensive to manufacture.

Other objects and advantages of this invention will become more apparent as the following description of an embodiment thereof progresses, reference being made to the accompanying drawing in which like reference characters are employed to designate like parts throughout the same.

Figure 1:
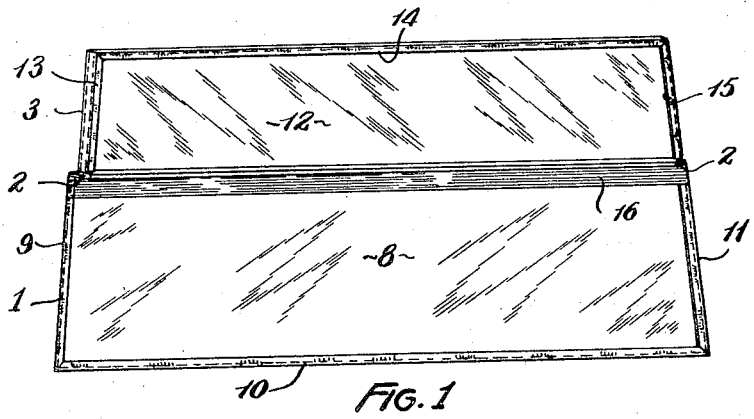
FIGURE 1 is a front elevation of a device embodying my invention.

I am aware that heretofore attempts have been made to combine in a structure such as rear view reflectors for vehicles, means not only for viewing directly to the rear of the vehicle but also for viewing to the left and right of direct rear. In such devices, however, certain disadvantages exist, such as distortion of viewing, interrupted transition of viewing from one direction to another with attendant hazards in driving, and the lack of clear continuity of vision from rear, right and left to frontal.

Furthermore, the present invention eliminates the necessity for auxiliary exteriorly mounted mirrors such as fender and door mounted types.

Referring now more particularly to the drawings wherein I have illustrated one embodiment of my invention, I provide in a single unit a pair of plane reflector surfaces mounted in a single frame and so disposed with respect to each other that the operator of a vehicle in which the unit is mounted may at all times observe clearly and without interruption traffic approaching from the rear right and rear left, as well as directly from the rear.

As illustrated, the device may consist of a frame comprising a substantially vertical elongate wall 1, an integrally formed substantially horizontal wall 2 extending forwardly of the wall 1, and a substantially vertical wall 3 contiguous with the forward edge of the wall 2 and angularly disposed to converge toward the plane of the wall 1 from one of its ends toward its other end.

Suitable means may be provided for mounting the device within the vehicle body on the dash or on the windshield frame, such as an adjustable bracket comprising a ball clamp split socket member 4 secured to the rear of the wall 1, and a mounting arm 5 terminating in a ball 6 which may be clamped in the split socket in a selected angular position by means of the screw 7. Other conventional adjustable types of mounts may be employed whereby the unit may be adjusted to proper and comfortable viewing position by the operator.

A rear and rear left view reflector or mirror element 8 is securely mounted on the wall 1 and is supported in the channels 9, 10 and 11 formed by bending the side and bottom edge portions of the wall 1 inwardly as shown.

A rear right reflector or mirror element 12 is rigidly supported on the wall 2 in a similar manner in the channels 13, 14 and 15 formed along the sides and top of the wall 3.

At 16 I have provided a relatively narrow strip of opaque material having a light absorbing surface which is preferably a dull black. This strip is positioned above the mirror 8 and may be coextensive with the length of the mirror, the top edge of the strip 16 lying just below the undersurface of the wall 2 which carries the upper mirror 12 above. The purpose of the strip is to provide a narrow area of no light reflection between the upper and lower mirrors, thus enabling the operator to shift his view from one mirror to the other without interference. This strip also eliminates reflections or glare which might originate from the undersurface of the wall 2.

I am enabled to construct a multiple reflector of this type which is compact in size and shape by virtue of the novel unitary supporting frame and the arrangement of the mirrors thereon for the purposes set forth, thereby eliminating bulky and complicated optical systems within the vehicle for rear, right and left viewing, as well as eliminating exteriorly mounted reflectors.

Figure 2:
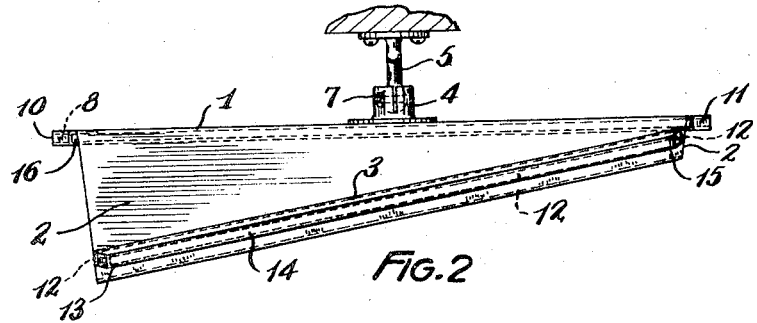
FIGURE 2 is a top plan view of the embodiment illustrated in FIGURE 1.
Figures 3, 4, 5:
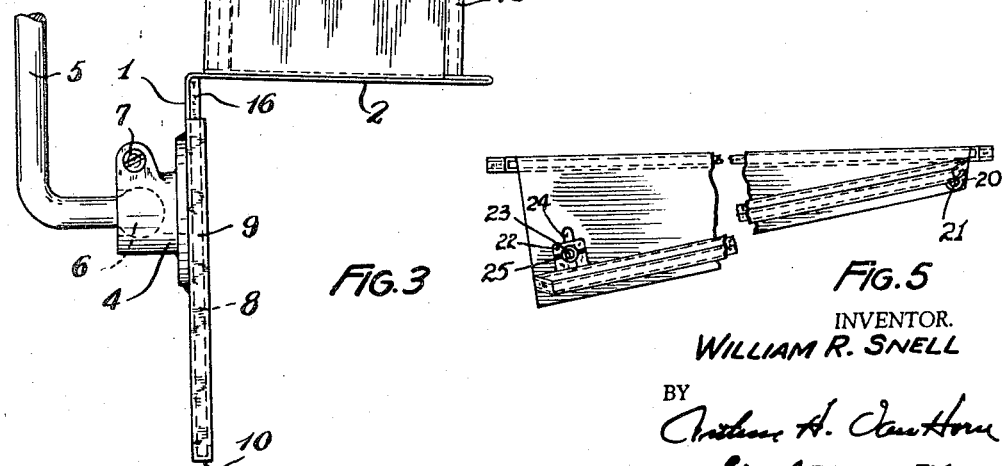
FIGURE 3 is a slightly enlarged end view of the device shown in FIGURE 1 as seen from the left in that figure.
FIGURE 4 is a section taken on line 4—4 of FIGURE 3.
FIGURE 5 is a view similar to that of FIGURE 2, and illustrates a modified form of the invention in which the mirrors are relatively adjustable about a substantially vertical axis.

As seen in FIGURE 3, when the unit is adjusted so that the wall 1 and mirror 8 are vertical, the wall 2 will lie in a plane which is substantially horizontal but which declines slightly to the right in this figure from the point of its connection with the wall 1 and, forming with the wall 1 an angle approximately within the range of 81° to 87°. Since the mirror 12 is supported on the wall 2 and substantially normal thereto, the substantially vertical plane of the mirror 12 will, with respect to that of the mirror 8, intersect that of the mirror 8 at a point well below the entire unit. At the same time it is to be noted that the upper mirror 12 lies in a substantially vertical plane which converges with the substantially vertical plane of the mirror 8 from left to right, as in FIGURE 2, and these planes will meet or intersect at a point just to the right of the device as viewed in FIGURE 2. The horizontal wall 2 is substantially triangular in shape with the base at the left and the apex area at the right in FIGURE 2 where the vertical planes of the mirrors 8 and 12 meet. This latter angular disposition of the mirror 12 with respect to the mirror 8 along the wall 2 is preferably in the range of approximately 8° to 14°. By such construction, the mirror 12 is directed to reflect the rear right traffic lane to the operator, while the mirror 8 will reflect the full rear and left rear lanes.

Of course, the entire device may be adjusted by the operator in any direction by means of the ball and socket mount at 4 and 6 until the rear left, the full rear and the rear right areas of the road are clearly and comfortably in the range of vision of the operator.

In FIGURE 5 I have illustrated a modified form of the invention wherein the mirrors or reflectors surfaces of the mirrors 8 and 12 may be adjusted relative to each other about a substantially vertical axis as viewed in this figure. More specifically, the reflector 12 and its frame 13, 14, 15 is provided with an outwardly disposed flange or tab 20 at its one end and is pivotally supported on the wall 2 by means of the pin 21 defining the axis of adjustment.

At the opposite end of this frame there is provided an inwardly disposed flat flange or tab 22 which overlies the top surface of the wall 2 and which is apertured to receive the threaded shank of the lock bolt 23 projecting upwardly in the slot 24. A lock nut 25 is threaded on the bolt and may be tightened to lock the mirror 12 in a selected adjusted position within the limits of travel of the bolt in the slot 24.

Thus, the operator may conveniently adjust the relative positions of the mirrors 8 and 12 about the axis of the pin 21 to obtain the most efficient and comfortable viewing conditions which will provide a selective range of rear viewing to the right and left to suit the pleasure of the operator.

Various changes may be made in the details of construction and arrangement of parts of the invention without departing from the spirit thereof or the scope of the appended claims.

I claim:
1. In a combined rear and right and left side view mirror for vehicles, a frame, a pair of elongated mirrors secured in the frame and arranged one above the other and disposed angularly relative to each other in a plurality of directions, said frame comprising as a single unitary structure a pair of upright mirror supporting walls vertically arranged one above the other and converging longitudinally toward each other at one end of the frame, and an intermediate substantially horizontally disposed connecting wall for said walls lying in a plane intersecting the plane of but one of said walls at less than 90°.

2. In a combined rear and right and left side view mirror for vehicles, a frame, a pair of elongated mirrors secured in the frame and arranged one above the other and disposed angularly relative to each other in a plurality of directions, said frame comprising as a single unitary structure a pair of upright mirror supporting walls vertically arranged one above the other and converging longitudinally toward each other at one end of the frame, and an intermediate substantially horizontally disposed connecting wall for said walls lying in a plane intersecting the plane of but one of said walls at less than 90° and normal to the plane of the other of said walls.

3. In a combined rear and right and left side view mirror for vehicles, a frame, a pair of elongated mirrors secured in the frame and arranged one above the other and disposed angularly relative to each other in a plurality of directions, said frame comprising as a single unitary structure a pair of upright mirorr supporting walls vertically arranged one above hte other and converging longitudinally toward each other at one end of the frame, and an intermediate substantially horizontally disposed connecting wall for said walls, the angular relation between the said walls and the connecting wall being such that the reflecting surfaces of said mirrors lie in planes converging downwardly to a point below said frame.

References Cited in the file of this patent
UNITED STATES PATENTS

| | | |
|---|---|---|
| 1,781,999 | Bittinger | Nov. 18, 1930 |
| 1,845,808 | Oishei | Feb. 16, 1932 |
| 1,858,734 | Fotakis | May 17, 1932 |
| 2,082,775 | Best | June 8, 1937 |
| 2,493,546 | Orser | Jan. 3, 1950 |
| 2,663,224 | Younglove | Dec. 22, 1953 |
| 2,708,086 | Prutzman | May 10, 1955 |
| 2,751,816 | Strong | June 26, 1956 |

FOREIGN PATENTS

| | | |
|---|---|---|
| 558,481 | Great Britain | Jan. 6, 1944 |